(12) United States Patent
Schuster et al.

(10) Patent No.: US 6,771,674 B1
(45) Date of Patent: *Aug. 3, 2004

(54) METHOD AND SYSTEM FOR FORWARD ERROR CORRECTION BASED ON PARALLEL STREAMS

(75) Inventors: Guido M. Schuster, Des Plaines, IL (US); Ikhlaq S. Sidhu, Vernon Hills, IL (US); Michael S. Borella, Naperville, IL (US); Jacek A. Grabiec, Chicago, IL (US)

(73) Assignee: 3Com Corporation, Marlborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,752

(22) Filed: Dec. 28, 1998

(51) Int. Cl.[7] .................................................. H04J 3/02
(52) U.S. Cl. ........................ 370/537; 714/776; 714/757
(58) Field of Search ................................. 370/231, 235, 370/252, 352, 356, 401, 394, 537–542, 410, 535, 522, 832, 532; 714/746, 776, 751, 755, 752, 799, 800, 803, 820, 801, 786, 757, 758

(56) References Cited

U.S. PATENT DOCUMENTS

| | | | | |
|---|---|---|---|---|
| 4,525,830 A | * | 6/1985 | Cohen et al. | 370/219 |
| 4,608,693 A | * | 8/1986 | Baranyai et al. | 714/801 |
| 4,731,785 A | * | 3/1988 | Ferene et al. | 370/537 |
| 4,833,671 A | * | 5/1989 | Beckner et al. | 370/429 |
| 4,920,529 A | * | 4/1990 | Sasaki et al. | 370/218 |
| 5,115,431 A | * | 5/1992 | Williams et al. | 370/394 |
| 5,608,738 A | * | 3/1997 | Matsushita | 714/752 |
| 5,608,786 A | * | 3/1997 | Gordon | 379/100 |
| 5,687,181 A | * | 11/1997 | Suemura et al. | 714/757 |
| 5,724,355 A | * | 3/1998 | Bruno et al. | 370/401 |
| 5,918,019 A | * | 6/1999 | Valencia | 395/200.57 |
| 5,983,388 A | * | 11/1999 | Friedman et al. | 714/776 |
| 6,079,042 A | * | 6/2000 | Vaman et al. | 714/755 |
| 6,141,788 A | * | 10/2000 | Rosenberg et al. | 714/774 |
| 6,145,109 A | * | 11/2000 | Schuster et al. | 714/752 |
| 6,161,008 A | * | 12/2000 | Lee et al. | 370/352 |
| 6,167,042 A | * | 12/2000 | Garland et al. | 370/354 |
| 6,169,795 B1 | * | 1/2001 | Dunn et al. | 379/209 |
| 6,175,871 B1 | * | 1/2001 | Schuster et al. | 709/231 |
| 6,188,683 B1 | * | 2/2001 | Lang et al. | 370/352 |
| 6,233,258 B1 | * | 5/2001 | Kanehara | 370/537 |
| 6,243,846 B1 | * | 6/2001 | Schuster et al. | 714/766 |
| 6,347,071 B1 | * | 2/2002 | Cupo et al. | 370/203 |
| 6,356,545 B1 | * | 3/2002 | Vargo et al. | 370/355 |
| 6,445,717 B1 | * | 9/2002 | Gibson et al. | 370/473 |

* cited by examiner

*Primary Examiner*—Dang Ton
*Assistant Examiner*—Phuc Tran
(74) *Attorney, Agent, or Firm*—McDonnell Boehnen Hulbert & Berghoff (57) ABSTRACT

A mechanism for forward error correction (FEC) coding, suitable for use where multiple payload streams are simultaneously transmitted from end-to-end. Instead of deriving parity information based on payload information carried within a given stream, the invention involves FEC encoding across multiple parallel streams and thereby deriving parallel parity information. The parallel parity information may then be transmitted to the receiving end in parallel with the underlying payload information. Beneficially, the invention can substantially reduce the time it takes for the transmitting end to derive parity information or for the receiving end to receive the information necessary to recover from data loss. The invention is especially suitable for use in IP telephony and particularly for implementation in an IP telephony gateway.

12 Claims, 5 Drawing Sheets

METHOD AND SYSTEM FOR FORWARD ERROR CORRECTION BASED ON PARALLEL STREAMS

BACKGROUND OF THE INVENTION

1. Field of the Invention

The present invention relates to data transmission systems and more particularly to a method and apparatus for facilitating correction of data loss in such a system. The invention is suitable for use in any telecommunications network or transmission path that includes an end-to-end or node-to-node connection for communication of multiple data streams between a pair of devices.

By way of example, and without limitation, the invention will be described in the context of transmitting packet based real time voice or other media signals over a packet switched computer network, for use in internet-based telephony (e.g., voice over IP (VoIP)). However, the invention may also be suitably employed to transmit other types of signals and over other networks (such as local area (LAN), metropolitan area (MAN) or wide area (WAN) networks, and circuit switched networks, for example) or direct end-to-end connections, as well as with other transmission protocols.

2. Description of the Related Art a. Packet Switched Network Communications

In a packet switched network, a message to be sent is divided into blocks, or data packets, of fixed or variable length. The packets are then sent individually over the network through multiple locations and then reassembled at a final location before being delivered to a user at a receiving end. To ensure proper transmission and re-assembly of the blocks of data at the receiving end, various control data, such as sequence and verification information, is typically appended to each packet in the form of a packet header. At the receiving end, the packets are then reassembled and transmitted to an end user in a format compatible with the user's equipment.

To facilitate packet-based communication over interconnected networks that may include computers of various architectures and operating systems, the networks and computers typically operate according to an agreed set of packet switching protocols. A variety of such protocols are available, and these protocols range in degree of efficiency and reliability. Those skilled in the art are familiar, for instance, with the Transmission Control Protocol/Internet Protocol (TCP/IP) suite of protocols, which is used to manage transmission of packets throughout the Internet and other packet switched networks.

Each protocol in the TCP/IP suite is designed to establish communication between common layers on two machines, or hosts, in the network. The lowest layer in the Internet is the "physical" layer, which is concerned with ensuring that actual bits and bytes of information pass along physical links between nodes of the network. The next layer is the link layer, which ensures a reliable connection between nodes in the network. The next layer is the "network" or "IP" layer, which is concerned with permitting hosts to inject packets of data into the network to be routed independently to a specified destination. The next layer in turn is the "transport" layer, which is concerned with allowing peer entities on source and destination hosts to carry on a conversation. Generally speaking, the IP and transport layers of the Internet are not concerned with the physical arrangement of the network, such as whether source and destination machines are on the same sub-network or whether there are other sub-networks between them.

The transport layer of TCP/IP includes two end-to-end protocols, TCP (Transmission Control Protocol) and UDP (User Datagram Protocol). TCP is a reliable connection-oriented protocol, which includes intelligence necessary to confirm successful transmission between the sending and receiving ends in the network. UDP, in contrast, is an unreliable connectionless protocol, which facilitates sending and receiving of packets but does not include any intelligence to establish that a packet successfully reached its destination. In general, UDP is used by applications that do not want TCP's sequencing or flow control and wish to provide their own.

According to the TCP/IP model, the TCP transport layer takes a data stream to be transmitted and breaks it up into independent connectionless segments or "datagrams." TCP adds to each of these packages a 20 byte header, which includes overhead information such as a source port number, a destination port number and a sequence number designed to allow the receiving end to properly reassemble the datagrams into the original message. The transport layer then "passes" each of these packages to the IP layer.

The IP layer in turn adds another header to each package, providing additional overhead information, such as a source IP address and a destination IP address. The IP layer then transmits the resulting packages through the Internet, possibly fragmenting each package into pieces or as it goes. As the pieces of the package finally reach the destination machine, they are reassembled by the IP layer and passed to the transport layer. The transport layer then arranges the original datagrams in proper sequence in an effort to reconstruct the original data stream for use by the receiving process and ultimately by an end user.

For real time data or media signals (such as voice or video) to be transmitted over packet switched networks, the packets to be transmitted may be encapsulated by one or more additional header layers according to established higher level protocols. An example of one such higher level protocol is Real Time Protocol or RTP. RTP may provide each packet with an 12 byte header containing timestamps and sequence numbers. Included in this header may be a 7 bit payload type, which may define the type of payload in the underlying data packet. In practice, when the transmitting and receiving network ends establish communication of such signals, they will negotiate a mutually acceptable meaning for these RTP payload types. By way of example, the RTP payload type may indicate the type of voice or video codec (e.g., G.729, G.723.1, etc.) used to compress the underlying media signal, thereby facilitating proper decoding at the receiving end.

Packet switched networks such as the Internet thus serve to provide end-to-end (or node-to-node) communication between a pair of network devices or machines. These network devices may access or be connected to the Internet through any suitable configuration. In a usual arrangement, for instance, each device is connected via a communications link (such as the public switched telephone network (PSTN) or a LAN) to a server or gateway that provides access to the Internet. The gateway is typically owned and operated by an Internet service provider (ISP) and is known as a network access server (NAS) or remote access server (RAS). Of course, the gateway itself may also be considered a network device or machine, as it serves to communicate over the network with a machine (e.g., another gateway) at another end or node.

Network access servers are commercially available from 3Com Corporation and other telecommunications equipment manufacturers such as Ascend Communications, Livingston Enterprises, and Multitech. A representative NAS is the Total Control Enterprise Network Hub from 3Com Corporation, as described in the patent of Dale M. Walsh, et al., U.S. No. 5,597,595 ("the Walsh patent"), which is fully incorporated herein by reference. This NAS has a telephone line interface that can be connected to a high-speed multiplexed digital telephone line, such as a T1 line or an ISDN line. The NAS further provides a plurality of digital modems to perform signal conversions (such as voice or video encoding) on the data from the telephone line channels and a bus network connecting the modems to a network interface card or module. Examples of such network interface cards are the NetServer™ and EdgeServer™ cards from 3Com Corporation. The network interface card in turn couples the NAS to a local or wide area network, such as the ISP backbone network or the Internet.

While packet switched networks have traditionally been used to carry non-realtime transmissions (such as e-mail messages or other data transfers), one of the promising new uses of these networks is to carry telephone conversations and other interactive communications. Known as "IP telephony" in the context of IP networks, the goal of this new technology is to replace or enhance conventional circuit switched telephone networks with more versatile and universal packet switched communications.

Figure 1:
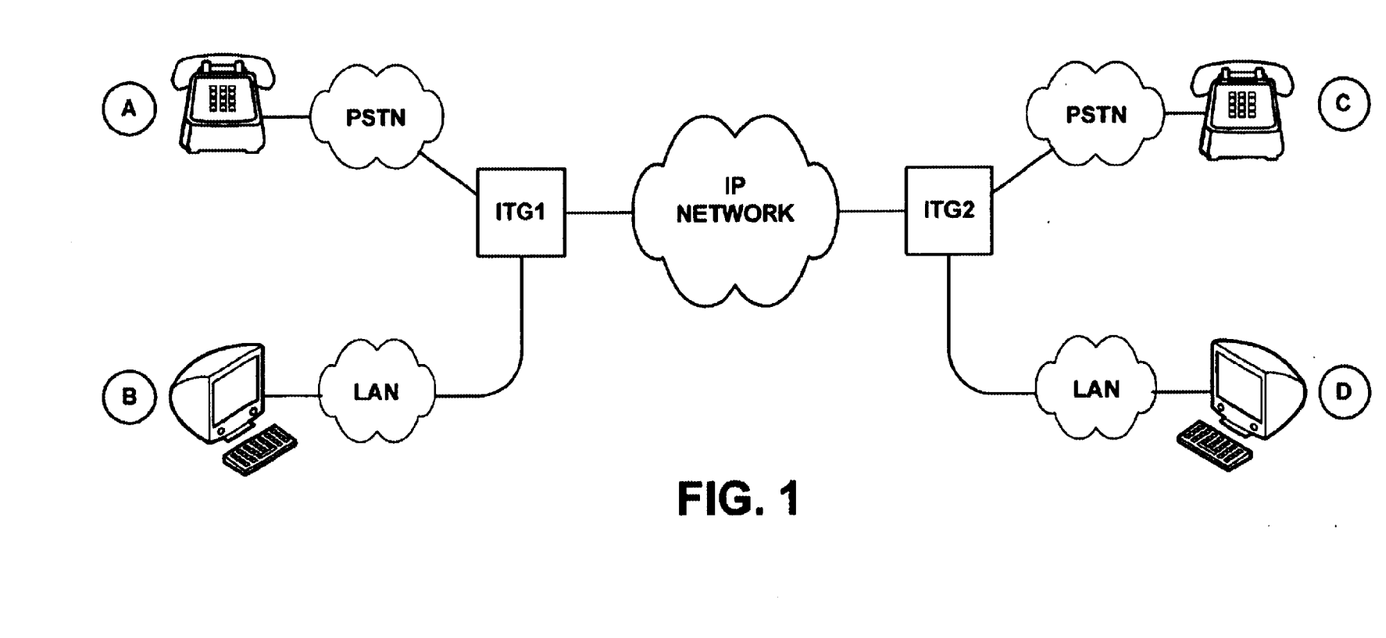
FIG. 1 illustrates a basic IP telephony configuration.

FIG. 1 illustrates a basic IP telephony configuration. In this configuration, users at two or more telephone devices are set to engage in a conversation over an IP network. Each telephone device may take any of a variety of forms. For instance, without limitation, the device may be a conventional analog telephone or a personal computer (PC) equipped with a handset (or a microphone and speakers) to facilitate a conversation. Each telephone device is served by an IP telephony gateway (ITG), which is owned by an IP telephony service provider (ITSP) and provides connectivity to the network. In practice, users may subscribe to the service provided by an ITSP and may then place and receive calls over the IP network via a communications link to their respective gateways.

The communications link may take any suitable form. For instance, if the telephone device is a conventional telephone, the communications link may be the conventional PSTN, with a T1 span extending to the ITG. In that case, a subscriber may place a call to the ITG over the PSTN. As another example, if the telephone device is a PC on a LAN, the communications link may be the LAN extending to the ITG. In that case, a subscriber may contact the ITG via the existing network connection. Of course, other suitable communications links are known or will be developed as well.

The ITG may take the form of a network access server similar to those described above, modified to the extent necessary to facilitate telephone conversations over the network. For instance, while the modems in a conventional NAS modulate and demodulate signals to communicate with subscribers' PC modems, the "modems" in an ITG may not need to modulate or demodulate signals. Instead, the modems may be configured to receive the telephone signals originating at subscriber telephone devices and to sample (if necessary), compress and packetize the signals for transmission over the network, and vice versa for signals coming from the network.

Like other network access servers, an ITG will typically receive and process a plurality of telephone conversation signals from subscriber devices and transmit these signals in parallel over the IP network to a destination gateway. At a given moment, for instance, the ITG may simultaneously receive a plurality of unrelated speech signals from a given communications link such as a T1 span, process those signals as necessary, and place a series of corresponding RTP packets onto the network in one or more outgoing packet streams for transmission to a destination gateway.

In this regard, two or more signals may be communicated "concurrently", "in parallel" or "simultaneously" with each other, for example, by conveying the signals as separate sequences of data or packets at once, and/or by interleaving (e.g., time division multiplexing) the data from the signals into a single sequence and conveying that single sequence, or by other such techniques. In other words, unless specified otherwise, use of these terms in this document does not necessarily mean "literally together" or "literally at the same time" (which could be impossible in some configurations) but may more reasonably be construed to mean approximately together or approximately at the same time. For instance, provided with three packet streams, $A=\{A_1, A_2, A_3 \ldots \}$, $B=\{B_1, B_2, B_3 \ldots \}$ and $C=\{C_1, C_2, C_3 \ldots \}$, representing three separate conversations, an ITG may simultaneously transmit these three streams over an IP network to a remote ITG as a single TDM stream $S=\{A_1, B_1, C_1, A_2, B_2, C_2, A_3, B_3, C_3 \ldots \}$.

a. Packet Loss, and Error Correction Efforts

Ideally, all of the packets transmitted into a packet switched network by the ITG should arrive successfully at the designated remote gateway, for conversion as necessary and transmission to the destination device. Either the remote gateway or the destination device, as the case may be, should then receive the transmitted IP packets, extract the payload from the packets and reconstruct an ordered data stream or signal for receipt by an end user.

Unfortunately, however, deficiencies in the existing communication infrastructure have precluded the successful widespread transmission of real time media signals, such as digitized voice, audio and video, from end-to-end over packet switched networks. One of the principles reasons for this lack of success is a high rate of packet loss and delay.

The Internet, for example, suffers from a high rate of packet loss and resulting transmission delays. In particular, depending on conditions such as how congested the Internet is at any given time, loss of entire packets has been found to occur on the Internet at a rate of up to 25%, or up to one in every four packets. Typically, this packet loss occurs one packet at a time, which might or might not perceptibly distort a real-time audio signal, but may perceptibly distort a real-time video signal, and would certainly distort a pure data signal such as an e-mail message. Often, however, burst errors occur on the Internet and result in the loss of multiple sequential packets in a row. Unlike the sporadic loss of a single packet, if left uncorrected, these burst errors can and will substantially and perceptibly distort almost any transmitted signal.

The connection-oriented TCP protocol provides a mechanism for responding to packet loss in an IP network. According to TCP, when a segment arrives at its destination, the receiving TCP entity should send back to the sending entity a segment bearing an acknowledgement number equal to the next sequence number that it expects to receive. If the sending entity does not receive an acknowledgement within a specified time period, it will re-transmit the package of data.

Generally speaking, this acknowledgment and re-transmission system works well to correct for packet loss. However, the system can unfortunately delay the complete transmission of a data stream. For the transmission of packets representing pure data signals such as e-mail messages, transmission delay is not ideal, although it is of secondary concern compared to an unrecoverable loss of information. Real-time media signals, however, are by definition highly sensitive to delay and will appear jumpy, interrupted or otherwise distorted if parts of the signal do not flow continuously to the receiving end. Further, in the context of interactive real-time communications such as packet-switched telephony, delay is even more problematic, since participants to such communications expect the network connection to simulate immediate, in-person interaction, without delay.

Rather than employing (or invoking) an acknowledgement and retransmission system, less delay in packet loss correction can be achieved by transmitting a correction code of some sort concurrently with the payload data, thereby providing the receiving end with sufficient information to recover lost packets. Several error correction code mechanisms are available for this purpose. These mechanisms include, for instance, convolution coding, interleaving and block coding, all of which are well known to those skilled in the art. Of these mechanisms, perhaps the most common is block coding.

Block coding calls for mapping a frame of binary source data into a coded block of data that includes a set of redundant parity symbols. By conventional terminology, an "(n,k)" block coder typically converts a group of k payload units (such as bytes or bits) from a data stream into a larger group of n units by deriving p=n−k parity units or forward error correction (FEC) codes. Each parity unit is generated through a predetermined coding technique based on all or some subset of the k payload units.

The parity units may then be transmitted in-stream with the underlying payload units (e.g., interleaved with the payload, or after the payload, or appended to the payload). Alternatively or additionally, the parity units may be transmitted in a separate stream in parallel with the underlying payload stream. This latter technique is described, for instance, in J. Rosenberg, H. Schulzrinne, An RTP Payload Format for Generic Forward Error Correction, Internet Engineering Task Force, Internet Draft, July 1998, the entirety of which is hereby incorporated herein by reference.

Many forms of block coding are now known. One of the simplest forms of a block code, for instance, is a repetition code, in which the binary source data is repeated as a set of parity bits. One of the more popular but complex block codes is the Reed-Solomon (RS) class of codes over the $2^8$ Galois field. These codes are optimal in their ability to correct erased bytes. For example, provided that 8 bytes are protected with 3 parity bytes (a total of 11 bytes), any three bytes can be lost, and the original 8 bytes may still be recovered.

Another example of block coding is to append or concatenate redundant parity information to existing data packets in the packet stream. For instance, as an offshoot of traditional repetition codes, the transmitting node may append to each data packet redundant copies of the preceding k number of data packets. In this way, the receiving end may readily recover a lost packet $D_i$ from one of the k subsequent packets $D_{i+1}$ . . . $D_{i+k}$. As more preceding packets are concatenated with each current packet in the stream, the network can then tolerate a higher rate of packet loss.

Still another block coding technique is described in co-pending U.S. patent application Ser. No. 08/989,616, entitled "A Forward Error Correction System for Packet Based Real Time Media" and filed on Dec. 12, 1997, the entirety of which is hereby incorporated by reference. According to this technique, parity bits associated with current packets are piggy-backed onto future packets. In particular, as a sequence of payload blocks is being transmitted, every k payload blocks in the sequence are fed through a block coder to create p=n−k forward error correction (FEC) codes or parity packets, where p≦k. Each of these p parity packets may then be concatenated respectively with one of the next p data packets being transmitted. In turn, at the receiving end, if a packet is lost, the associated payload may be extracted from the parity blocks carried by the appropriate subsequent group of packets.

Yet another coding technique is described in U.S. patent application Ser. No. 08/989,483, also entitled "A Forward Error Correction System for Packet Based Real Time Media" and filed on Dec. 12, 1997, the entirety of which is also hereby incorporated by reference. According to this technique, a single parity block p may be derived as an XOR sum of the payload carried by the preceding k packets in the stream and then concatenated with the current packet for transmission. With this technique, regardless of the number of sequential packets to be recovered at the receiving end, the size of the forward error correction code remains of the same order as the payload itself.

While each of these forward error correction coding techniques has its advantages, the existing techniques still suffer from at least one inherent disadvantage: delay. In particular, since the parity information, p, is derived as some function of group of preceding payload information, k, the receiving end will usually not receive the parity information until it first receives all of the payload information. Therefore, in response to a loss of some payload information, the receiving end will need to wait until the necessary parity information arrives in order to recover the lost information.

Further, provided with a complex coding scheme in which a number of the k payload units (as well as the parity unit(s)) are required in order to recover from a loss of one or more of the k payload units, the receiving end will need to wait until all of those necessary payload units arrive as well. Thus, regardless of whether the parity units for a given stream are transmitted in-stream with the underlying payload or in a separate FEC stream, some additional delay will inherently occur in responding to packet loss.

As noted above, any such delay is problematic in the context of real time media transmissions and particularly so in the context of interactive network communications such as IP telephony. While one way to reduce this delay may be to use less complex FEC schemes (such as simple repetition codes), that solution is likely to be unacceptable as the quality of error correction may decrease and the bandwidth may increase.

In view of these deficiencies in the existing art, a need exists for an improved system of forward error correction coding.

SUMMARY OF THE INVENTION

The present invention provides a simple yet elegant mechanism for forward error correction coding, suitable for use where multiple data streams are simultaneously transmitted (e.g., in a time, frequency or code division multiplexed stream) over a data network or other end-to-end connection. The invention stems from the realization that existing FEC encoding schemes are carried out within each real time stream to be transmitted. This encoding process inherently causes delay from at least two perspectives.

First, the transmitting end cannot generate and transmit the required parity information (e.g., the p units in a block coder) until it first knows of the underlying payload information (e.g., the k units) that will go into the parity computation. Second, assuming that packets arrive at the receiving end in approximately the same order that they were transmitted, the receiving end will probably need to wait for both the parity information and the underlying payload information to arrive before it can recover lost payload. This is the case whether the FEC information is transmitted in-stream with the underlying payload and/or transmitted in a separate stream in parallel with the underlying payload stream. The basic problem is that the parity information is computed and/or transmitted after the underlying payload information.

The present invention advantageously introduces a new dimension to the FEC encoding process, which achieves a substantial reduction in the time delays that were inherent in the art. According to the invention, FEC encoding is conducted in parallel across multiple data streams that are to be transmitted concurrently from one location to another, rather than within the individual data streams. In one embodiment, for instance, the resulting parity information may then take the form of a parity data stream that may itself be transmitted to the remote location in parallel with the underlying payload data streams. As a consequence, the receiving end can receive all of the information necessary to recover from a data loss much sooner in time, if not immediately, after it detects the data loss.

Except to the extent claimed, the particular FEC coding scheme used is not pertinent to the present invention, except that the resulting parity information should preferably be transmitted to the receiving end closely in time (or concurrently) with the underlying payload information. As a result, the parity information can theoretically arrive at the receiving end together with (i.e., in parallel with) all of the underlying payload information, rather than after all of the underlying payload information. Consequently, the receiving end will, for all practical purposes, not have to wait for the underlying payload and parity information to arrive before correcting for data loss. The invention thus beneficially facilitates recovery from data loss without adding additional delay.

According to one embodiment, the present invention may include generating parallel FEC information based on a parallel combination of at least two data streams that are transmitted in parallel over a network from a first device to a second device (i.e., destined for receipt by the second device), and transmitting that parallel FEC information to the second device in parallel with the underlying data streams. In this embodiment, the first and second devices may be positioned at locations remote from each other, and the network may be a packet switched network and each of the data streams may be a packet stream representing an underlying independent telephone conversation.

Further, in this embodiment, the parallel FEC information may be derived as a functional combination of the data packets in the underlying packet streams, according to a predetermined FEC encoding scheme. The parallel FEC information may then take the form of a parity packet stream, which may be transmitted in parallel with the underlying packet streams, such as by time division multiplexing the parity packet stream with the underlying packet streams. Except for any packets lost in transmission, then, the second device should receive a given set of parity information at about the same time as it receives the underlying data information that was functionally combined to result in the parity information. In addition, for reference by the receiving end, each of the packets in the parity packet stream may be labeled as a parallel FEC packet by including an appropriate header, such as a predetermined RTP payload type.

Alternatively, as noted above, the present invention may extend to transmission over a circuit switched network or other type of network or direct end-to-end connection. Further, the payload that is transmitted over the network may represent any type of media or data signals, such as, for example, voice (e.g., telephone conversation signals), video (e.g., video conferencing signals), audio (e.g., radio signals), or pure data signals (e.g., e-mail signals).

By way of example, in the context of IP telephony, an embodiment of the invention may be carried out in a common processing unit in the ITG and may include deriving and transmitting a separate FEC packet stream based on a parallel combination of a plurality of independent conversation streams. For instance, assume that subscribers A and B are each served by the same local ITG and are concurrently engaging in separate IP telephony conversations with other subscribers served by a common remote ITG. According to one application of the invention, the local ITG may continuously derive a separate FEC packet stream whose data is computed as an XOR sum of packets in the unrelated conversation streams representing voices from A and B, respectively, and the local ITG may transmit that separate FEC packet stream to the remote ITG in parallel with the underlying conversation streams. Beneficially, (assuming that the packets arrive somewhat in sequence) the remote ITG can then receive all information necessary for recovery of a lost packet immediately (or almost immediately) when the remote ITG detects the packet loss.

The foregoing as well as other advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENT

The present invention facilitates improved end-to-end communication of multiple parallel data streams over a data network or other communication path. As noted above, the invention can be used for the transmission of various types of data signals (e.g., voice, video, graphics, data, etc.) and in transmissions over various types of networks or end-to-end connections. However, the invention is particularly well suited for use in the context of interactive network communications that involve the simultaneous end-to-end (or node-to-node) transmission of multiple parallel data or media streams. As noted above, for purposes of illustration, the invention will be described in the context of IP telephony or, more generally, voice over IP.

In practice, to place a telephone call over the IP network, a caller operating a telephone device (such as a telephone or PC, for example) may connect to a local IP telephony gateway (ITG) via a suitable communications link (such as the PSTN and/or another network, for example). Once this connection is established, the local ITG may receive from the calling device an indication of a called party number, and perhaps a caller personal identification number (PIN). Based on the destination phone number, the local ITG may then query a translation table in a pre-established database, to identify an IP address that corresponds to a remote ITG serving the destination telephone number. Provided with the destination IP address, the local and remote ITG may then set up packet-based communication, and the local ITG may transmit to the remote gateway packets representing the caller's voice. In turn, the remote gateway should ideally receive the transmitted packets, reconstruct a packet stream, and forward a suitable voice signal to the destination telephone device.

Figure 2:
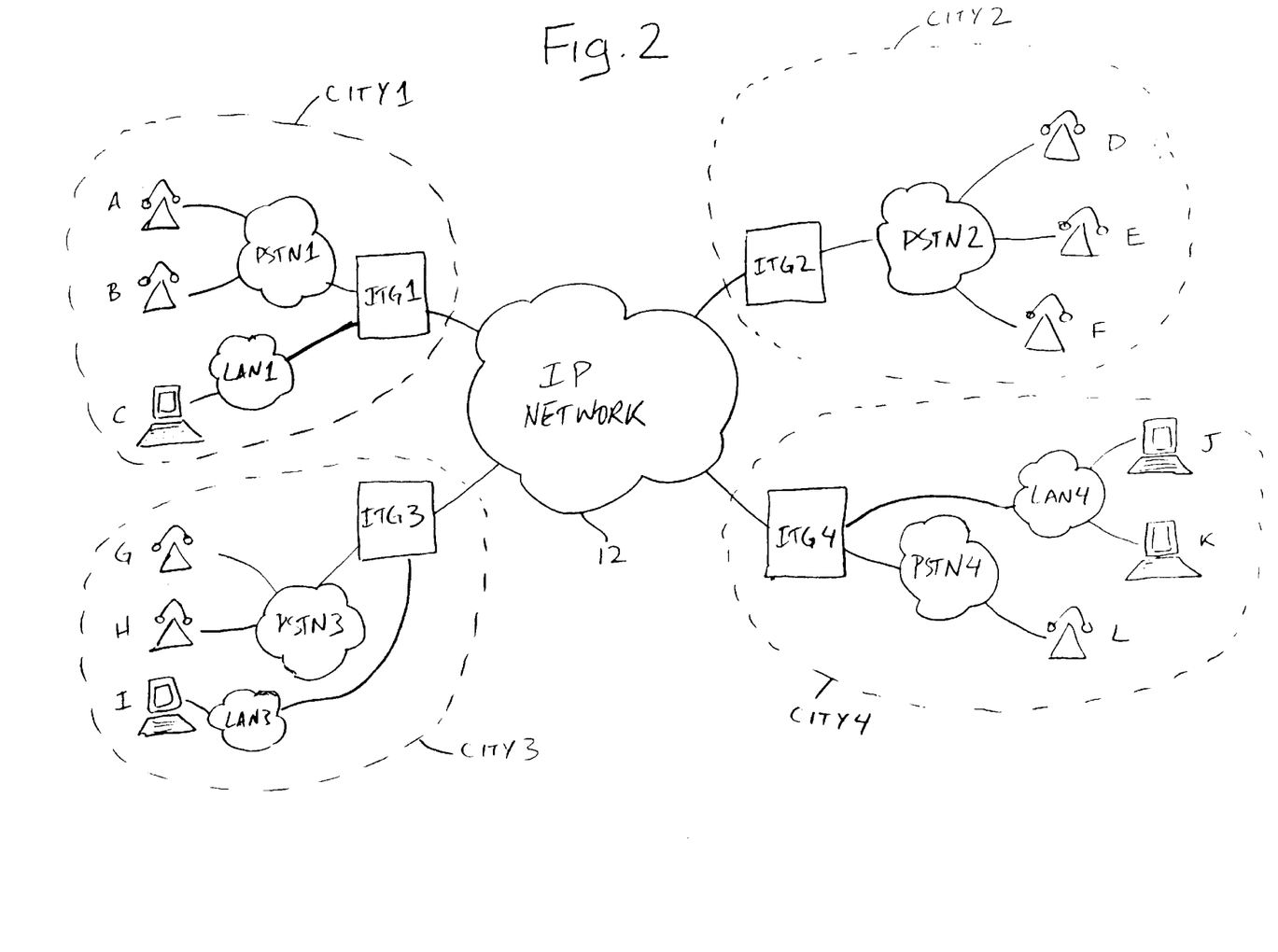
FIG. 2 illustrates a network especially designed for voice over IP, in which an IP telephony gateway is positioned in each major city.

In networks that are especially designed for VoIP, there will typically be at least one ITG in each major city, each serving a plurality of telephone service subscribers. FIG. 2 illustrates one such network configuration, by way of example. As shown in FIG. 2, each of four cities CITY1–CITY4 includes a respective IP telephony gateway ITG1–ITG4, which provides interconnectivity to a common IP network 12. In turn, ITG1 serves telephone subscribers A, B and C, ITG2 serves telephone subscribers D, E and F, ITG3 serves telephone subscribers G, H and I, and ITG4 serves telephone subscribers J, K and L. In this example configuration, subscribers A and B use conventional telephones that may be interconnected to ITG1 via the local telephone network PSTN1, for instance, by calling a toll-free number associated with ITG1. Subscriber C, in turn, uses a multi-media PC (equipped with full duplex speakerphone software and a telephone handset), which may be interconnected to ITG1 via a LAN. Similarly, subscribers D, E and F are each interconnected to gateway ITG2 via PSTN2.

Provided with an ITG serving each major location, there will commonly be many active conversations between a pair of gateways at any given time. Referring to FIG. 2, for instance, suppose subscriber A in CITY1 wishes to speak to subscriber D in CITY2, and subscriber C in CITY1 wishes to speak to subscriber E in CITY2. To accomplish this, A may place a call to ITG1 via PSTN1, and C may also place a call to ITG1 via LAN1. Gateway ITG1 would receive A's voice signal and transport the signal over the IP network to remote gateway ITG2, for ultimate receipt by D. In addition, gateway ITG1 would receive C's voice signal and packetize and transport the signal over the IP network to remote gateway ITG2, for ultimate receipt by E. ITG2 would then receive and de-packetize these signals and forward the corresponding voice signals via PSTN2, respectively, to D and E. Depending on the capacity of the respective gateways and the demand for telephone traffic, it is clear that the number of packet streams that are transmitted in parallel from one gateway to another at any given time can of course be very large.

Figure 3:
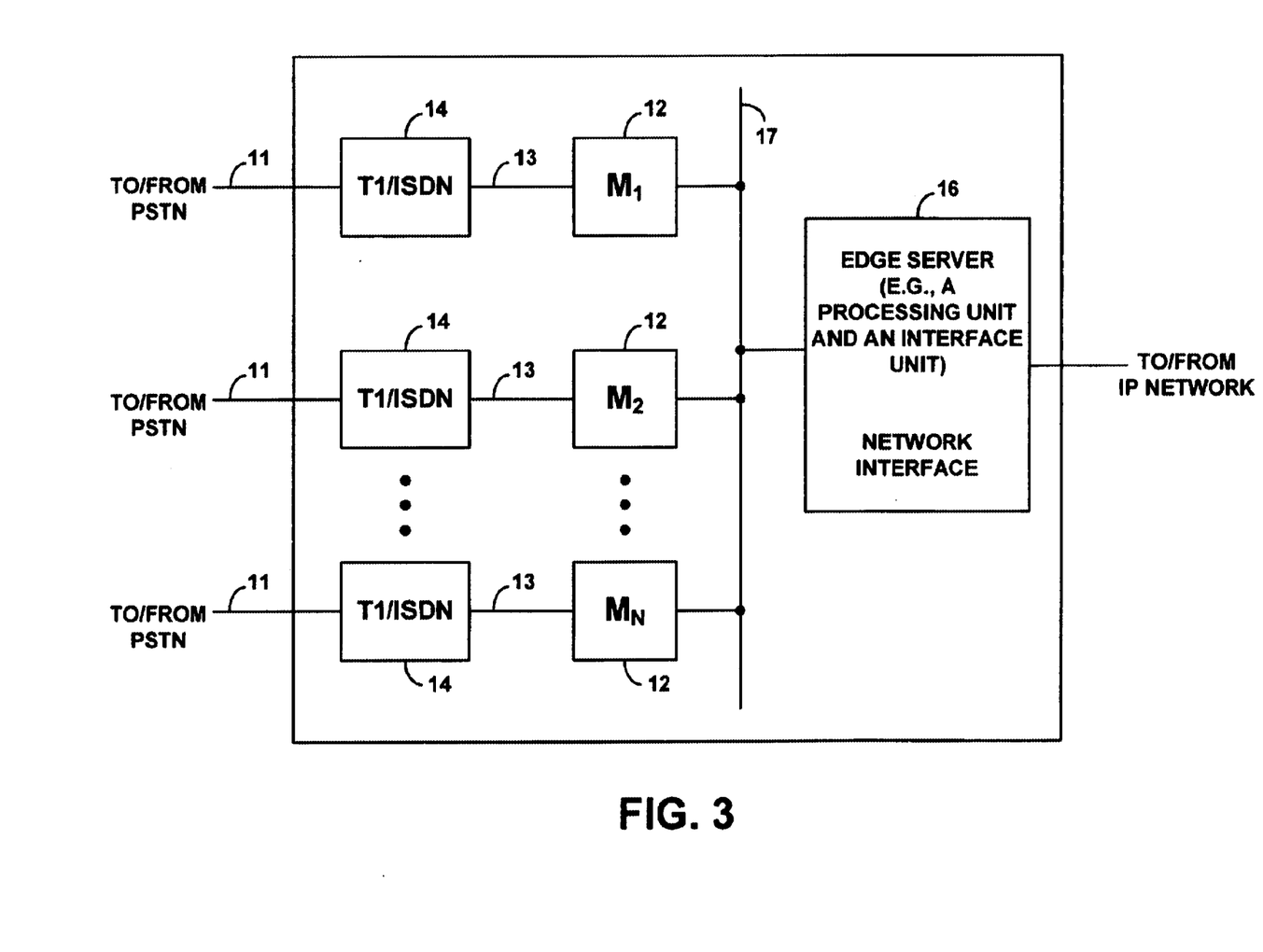
FIG. 3 illustrates a simplified block diagram of an IP telephony gateway suitable for employing the present invention.

In the context of IP telephony, the present invention may be employed in an ITG that is suitable for conveying multiple packet streams simultaneously over an IP network. FIG. 3 shows a simplified block diagram of one such ITG 10 by way of example. The details of a network access server similar in configuration to this ITG are disclosed in the Walsh patent, which has been incorporated herein by reference, and the reader is therefore directed to the Walsh patent for such details. Of course, other ITG configurations now known or later developed could be suitable as well. Further, the present invention may be employed in other network devices, such as, for example, a LAN server or PBX server.

Referring to FIG. 3, exemplary ITG 10 includes a plurality of high density modem modules 12, each having a T1/ISDN telephone line interface 14. The high density modem modules 12 communicate with a network interface 16 over a packet system bus 17. The high density modem modules, the telephone interfaces and the network interface are preferably on individual printed circuit boards or cards arranged in a chassis. The high density modem modules are "high density" in that each contains a high density digital signal processing (DSP) configuration capable of handling 23, 24 or 30 DS0 channels. An exemplary high density DSP is the HiPer DSP available from 3Com Corporation.

By providing a set of high density modem cards 12 and a robust computing platform in the network interface 16, a single chassis can process many hundreds of calls through the device simultaneously. In this regard, each modem card 12 performs modem functions for a large number of channels on the telephone line. For example, each high density modem card 12 may perform modem functions for 23 B channels plus 1 D channel for an ISDN Primary Rate Interface, 24 DS0 channels for a T1 line and 30 channels for an E1 line.

In the exemplary ITG of FIG. 3, each high density modem card 12 has its own T1/ISDN telephone line interface 14 connected to an ISDN PRI or T1 line. The T1/ISDN telephone line interface 14 is connected to the high density modem cards by a TDM bus 13, as described in the Walsh patent. The T1/ISDN telephone line interface by 4 is composed of two separate modules (not shown), an incoming call interface module and an incoming call application module. The interface module physically receives the incoming T1 span lines at connection 11, converts the signal in a digital TTL format and delivers the signal to the incoming call application module. The interface module provides a channel switching unit (CSU) interface, which recovers clock signals and data from the incoming T1 signals, and also provides the transmission of outgoing digital telephone signals representing digital data to the T1 line at connection 11. The application module provides framing of recovered T1 data to extract the T1 DS0 channel data and then switches the channel data twenty four time slots on a TDM bus 13 to the corresponding high density modem module 12. Of course, the telephone interface may take other forms as well.

The high density modem cards 12 are connected to the network interface card via a high-speed parallel packet bus 17, similar to that described in the Walsh patent. The number of high density modem cards 12 and associated telephone line interface cards 14 is essentially arbitrary, but 10 to 24 such cards are typical in a high density gateway application today, providing modem functionality for between 240 and 576 DS0 channels. network interface or EdgeServer™ card 16 consists of a general purpose computing platform (such as an IBM PC) running an operating system such as Windows NT™ from Microsoft Corporation or UNIX. The network interface card 16 contains software and hardware modules to perform call routing, modem configuration and other features as set forth and described for the gateway modules in the Walsh patent as well as in the patent of Baum et al., U.S. Pat. No. 5,577,105, which is also fully incorporated herein by reference. Further details of the design and features of the EdgeServer™ card 16 are set forth in the U.S. patent application of Verthein et al., application Ser. No. 08/813,173, which is fully incorporated herein by reference as well.

Figure 4:
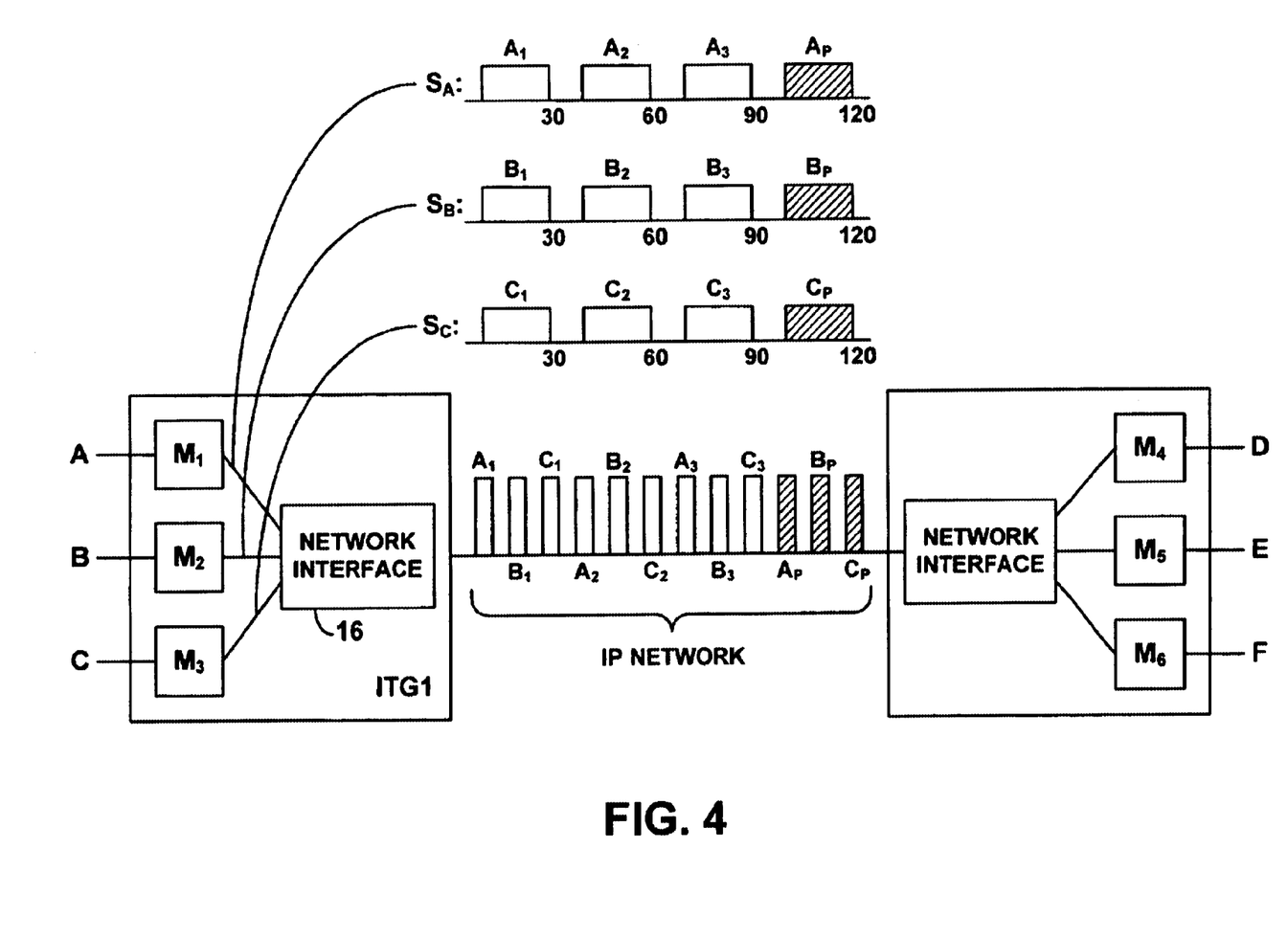
FIG. 4 illustrates the mechanics of a prior art forward error correction system.

As noted in the background section above, packet loss has been a problem in real time media transmissions over IP networks. While forward error correction (FEC) techniques have been proposed to manage packet loss, many of these techniques will unfortunately give rise to additional delays in transmission, since the FEC coding is carried out within the payload streams that are being transmitted. FIG. 4 illustrates this scenario, with respect to the gateways ITG1 and ITG2 of FIG. 2.

Referring to FIG. 4, assume that modems M1, M2 and M3 each receive a conversation signal respectively from subscribers A, B and C. (For example, these signals may arrive as a TDM bit stream on a single T1 line and be distributed internally to the various modems.

Alternatively, for example, the signals may arrive on separate T1 lines associated with respective modems.) The modems compress, packetize and FEC encode the respective signals, producing packet streams $S_A$, $S_B$, and $S_C$, each representing one of the conversation signals. These output packet streams may, for instance, be as follows:

$S_A$: $\{A_1, A_2, A_3, \ldots\}$,
$S_B$: $\{B_1, B_2, B_3, \ldots\}$, and
$S_C$: $\{C_1, C_2, C_3, \ldots\}$, For purposes of example, the modems may be assumed to compress and packetize the signals according to the well known G.723.1 codec (running at 6.4 kbps) using RTP/UDP/IP packets as transport, so that the output payload packets are each 64 bytes long. Of course, other compression schemes or transport protocols could be used as well. The modems may be assumed to add the necessary header layers (e.g., RTP/UDP/IP) to each packet to facilitate transmission in the IP network and communication between transmitting and receiving ends.

Further, by way of example, the FEC encoding scheme may be assumed be a simple (4,3) XOR block coding scheme, in which every group of three payload packets is XOR summed to derive a parity packet. Thus, as illustrated in FIG. 4, the output packet streams may be:

$S_A$: $\{A_1, A_2, A_3, A_P, \ldots\}$,
$S_B$: $\{B_1, B_2, B_3, B_P, \ldots\}$, and
$S_C$: $\{C_1, C_2, C_3, C_P, \ldots\}$, where
$A_P = A_1 \oplus A_2 \oplus A_3$
$B_P = B_1 \oplus B_2 \oplus B_3$
$C_P = C_1 \oplus C_2 \oplus C_3$.

and where a subscript number represents a payload packet, and the letter P represents a parity packet derived as the XOR sum of the preceding three payload packets. Additionally, for sake of illustration, assume that each of these packets is generated every 30 milliseconds (e.g., for a transmission speed of 17.1 kpbs). Of course, other FEC coding schemes (such as those described above, for example) could be used instead.

Notice that, even in this simple example, some delay will arise at the transmitting end during the process of FEC encoding. Considering stream $S_A$, for instance, since $A_P$ is computed as an XOR sum of payload packets $A_1$, $A_2$ and $A_3$, ITG1 will not fully compute $A_P$ until it has processed (or at least generated or received) the three underlying payload packets. Further, assuming that ITG1 transmits packets as they become available, ITG1 would not transmit the parity packet $A_P$ until it has first transmitted the three underlying payload packets. This is probably true regardless of whether ITG1 transmits parity packet $A_P$ in stream with the underlying payload or ITG1 transmits the parity information in a separate stream.

In turn, additional delay will almost certainly arise in FEC decoding at the receiving end as well. For instance, assume that, as shown in FIG. 4, modems M1, M2 and M3 in ITG1 forward the three FEC encoded packet streams $S_A$, $S_B$ and $S_C$, to network interface unit 16, which, in turn, time division multiplexes the three streams (or the packets as they arrive from the modems) and places the packets onto the IP network for transmission to ITG2. The resulting packet sequence SN that ITG1 outputs onto the network (albeit at a higher speed than the individual incoming signals) may therefore be as follows:

$S_N$: $\{A_1, B_1, C_1, A_2, B_2, C_2, A_3, B_3, C_3, A_P, B_P, C_P, \ldots\}$.

Assume in this example scenario that packet $B_1$ is lost in transmission over the IP network. ITG2 will detect this packet loss and seek to recover packet $B_1$ through use of parity block $B_P$. In particular, ITG2 may recreate $B_1$ by taking the XOR sum $B_2 \oplus B_3 \oplus B_P$. Unfortunately, however, assuming that the remaining packets arrive substantially in sequence (a fair assumption), ITG2 will not receive all of the necessary packets, $B_2$, $B_3$ and $B_P$, for this recovery without having to wait. For instance, before ITG2 receives the necessary parity packet $B_P$, ITG2 will probably first receive and process the packets $C_1$, $A_2$, $B_2$, $C_2$, $A_3$, $B_3$, $C_3$ and $A_P$. Thus, ITG2 would not be able to reconstruct the original conversation signal without enduring an eight packet delay. At high speeds, an eight packet delay could be on the order of 90 ms, which could unfortunately be a substantial portion of the maximum acceptable round trip delay.

Of course, as more complex FEC schemes are used, even more delay may occur. For instance, if the FEC scheme involves block coding with more payload information at a time, then the transmitting end may have to wait even more time before it can derive and transmit the necessary parity information, and the receiving end may have to wait even more time before it will receive the parity and payload information needed to recover from a data loss.

As discussed above, a basic problem in these existing FEC schemes is that they involve computing parity information based solely on a combination of payload units within a given stream. The present invention solves this problem, where multiple (i.e., two or more) data streams are being transmitted in parallel with each other. According to a preferred embodiment of the invention, transmission efficiency can be greatly improved by FEC encoding across these multiple parallel packet streams, rather than within each given stream. In particular, by operating across several streams that are transmitted in parallel, it becomes possible to both (i) transmit parity information concurrently with the underlying payload information and (ii) concurrently receive parity information and the underlying payload information. Therefore, the invention may facilitate much quicker, if not immediate, recovery from packet loss.

Figure 5:
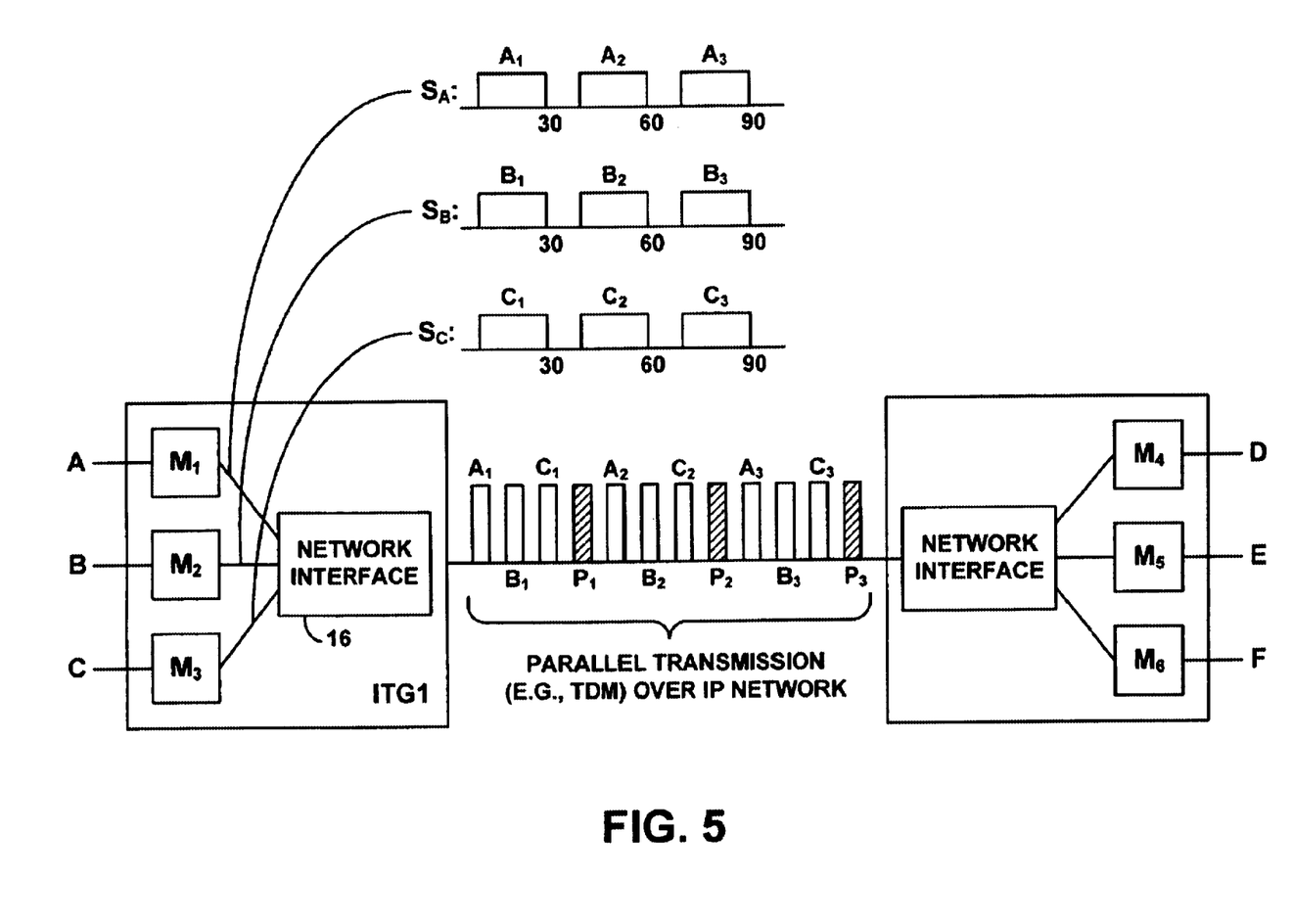
FIG. 5 illustrates the mechanics of an improved forward error correction system in accordance with a preferred embodiment of the present invention.

The improved FEC mechanism of the present invention is illustrated by way of example in FIG. 5. As shown in FIG. 5, modems M1, M2 and M3 each receive a conversation signal respectively from subscribers A, B and C. These conversation signals may be (and probably are) entirely unrelated to each other. The modems compress and packetize the respective signals, producing packet streams $S_A$, $S_B$, and $S_C$, each representing one of the conversation signals. By analogy to the above example, these output packet streams may be as follows:

$S_A$: {$A_1, A_2, A_3, \ldots$},
$S_B$: {$B_1, B_2, B_3, \ldots$}, and
$S_C$: {$C_1, C_2, C_3, \ldots$}, Advantageously, instead of FEC encoding each of these packet streams individually and producing parity packets as to each stream like the existing art, the preferred embodiment of the present invention calls for FEC encoding the streams in parallel with each other. More particularly, the preferred embodiment calls for functionally combining data carried by the individual conversations into parity information that can then be transmitted concurrently with the underlying conversation (payload) streams themselves. This operation may be referred to as "parallel FEC," and the resulting parity information may be referred to as parallel FEC information (e.g., parallel FEC packets, or parallel FEC data). The parallel FEC information may take the form of a separate parity stream (i.e., parallel FEC stream) or, for convenience, a set of information interleaved in part or in whole with another stream that is to be transmitted to the same remote location or receiving end. In turn, the receiving end may concurrently receive both the parity information and the underlying payload information (except for lost data), thereby avoiding much or all of the delay that would otherwise be added by the FEC process.

Assuming, for example, that a simple XOR coding scheme is used for this purpose, the invention may include deriving a parity packet stream (or parallel FEC stream) $S_P$ from payload streams $S_A$, $S_B$ and $S_C$, where:

$S_P$: {$P_1, P_2, P_3, \ldots$},
and
$P_1 = A_1 \oplus B_1 \oplus C_1$
$P_2 = A_2 \oplus B_2 \oplus C_2$
$P_3 = A_3 \oplus B_3 \oplus C_3$.

In the preferred embodiment, this FEC encoding function may be performed by a computer processor executing a set of machine language instructions (i.e., computer code) that are stored in a memory or other storage medium. The processor and memory may be located at any suitable location(s), such as in the ITG or in a peripheral or independent device positioned to process the data streams that are to be transmitted. In this regard, if the underlying payload streams $S_A$, $S_B$ and $S_C$ might each be generated or processed by separate modems in ITG1, then it may not be practical to derive the parallel FEC information in those same modems. Rather, the parallel FEC encoding function may be best carried out by some other, common processing unit.

For instance, the common processing unit may be a dedicated processor (e.g., hardware, software or firmware) in ITG1, which receives payload streams from the modems and forwards the payload streams and a parallel FEC stream to network interface unit 16. Alternatively, the common processing unit may be an integral part of the network interface unit 16 itself, such as the EdgeServer™ card described above. In this regard, one of ordinary skill in the art may program the EdgeServer™ card with a set of machine language instructions for deriving one or more parallel FEC streams in accordance with the present invention, and the EdgeServer™ may then transmit the parallel FEC stream(s) over the network concurrently with the underlying payload streams.

Of course, other suitable configurations may be employed to carry out the parallel FEC operation of the preferred embodiment, limited only by the imagination of those of ordinary skill in the art. Further, it will be understood that a receiving gateway (e.g., ITG2) may be suitably programmed or designed to decode parallel FEC information received from the network and to thereby recover from data loss. Of course, the mechanics of the FEC decoding process will depend on the particular FEC scheme being used. In this regard, the reader is directed to the patent documents incorporated by reference above for a discussion of some exemplary FEC encoding and FEC decoding processes.

From a network perspective, in the present example, the parallel FEC stream $S_P$ may be treated as just an additional stream of packets that are transmitted over the IP network from ITG1 to ITG2. In particular, according to the preferred embodiment, ITG1 may transmit this parity stream in parallel (i.e., concurrently) with the underlying payload streams $S_A$, $S_B$ and $S_C$. Thus, referring again to FIG. 5, the network interface unit 16 of ITG1 preferably time division multiplexes the packets of streams $S_A$, $S_B$, $S_C$ and $S_P$ as they become available and places the packets onto the IP network for transmission to ITG2. The resulting sequence of packets $S_N$ transmitted over the network from ITG1 to ITG2 may therefore be as follows:

$S_N$: {$A_1, B_1, C_1, P_1, A_2, B_2, C_2, P_2, A_3, B_3, C_3, P_3 \ldots$}

As above, assume now that packet $B_1$ is lost in transmission over the IP network. ITG2 may detect this packet loss and seek to recover packet $B_1$ through use of parity block $P_1$. In particular, ITG2 may recreate $B_1$ by taking the XOR sum $A_1 \oplus C_1 \oplus P_1$. Advantageously, in this example, ITG2 will probably receive or have received all of these necessary packets $A_1$, $C_1$ and $P_1$ almost immediately after detecting the loss of $B_1$. Specifically, assuming the packets arrive in order, ITG2 will receive packets $A_1$ and $C_1$ and thereby detect the loss of packet $B_1$, and the next packet that ITG2 receives will be packet $P_1$. For all practical purposes, there will therefore be no (or at least much less) additional transmission delay with this improved FEC scheme, compared to the schemes employed in the prior art.

According to the preferred embodiment, some mechanism should be provided in order to ensure that the receiving end can distinguish parallel FEC packets from the underlying payload packets. A simple way of drawing this distinction is to label parallel FEC packets with a unique RTP payload type. For instance, when gateways ITG1 and ITG2 initially negotiate a communication protocol over the IP network, they may agree that a an RTP payload type of 180 (or some other value) means that the packet is a parallel FEC packet taken as a simple XOR byte-wise sum across 3 payload packet streams (i.e., (n,k)=(4,3)). Of course, any other suitable mechanism can be used to identify FEC packets derived according to the present invention.

The present invention thus provides a simple yet highly beneficial mechanism for forward error correction where multiple data streams are concurrently transmitted end-to-end. By deriving parallel FEC information across multiple streams and then transmitting the parallel FEC information in parallel with the underlying streams, transmission delay can be reduced. In this regard, provided with the above description, those of ordinary skill in the art should understand that the elements of the invention can be claimed to extend to suitable alternatives and equivalent elements known in the art. It will thus be understood that changes and modifications may be made to the invention without deviating from the spirit and scope of the invention as claimed.

We claim:

1. In a telecommunications network including a first device and a second device, said telecommunications network comprising a packet-switched network, said first device transmitting a plurality of data streams in parallel to said second device, said data streams comprising data packet streams each defining a sequence of data packets, an improved method of communicating said plurality of data streams comprising, in combination:

combining together at least two of said plurality of data streams in parallel to generate parallel FEC information, wherein a first of the at least two data streams represents media originating from a first source, wherein a second of the at least two data streams represents media originating from a second source different that the first source, and wherein said parallel FEC information comprises parallel FEC packets derived as a functional combination of the data packets defined by at least two of said data packet streams;

labeling said parallel FEC packets with a predetermined header identifying said packets as parallel FEC packets; and transmitting said parallel FEC information to said second device in parallel with said plurality of data streams.

2. A method as claimed in claim 1, wherein said functional combination comprises an XOR sum.

3. A method as claimed in claim 1, wherein said parallel FEC packets cooperatively define a parallel FEC packet stream, and wherein transmitting said parallel FEC information to said second device in parallel with said plurality of data streams comprises transmitting said parallel FEC packet stream concurrently with said plurality of data packet streams.

4. A method as claimed in claim 3, wherein transmitting said parallel FEC packet stream concurrently with said plurality of data packet streams comprises time division multiplexing said parallel FEC packets with the data packets that were functionally combined to obtain said parallel FEC packets.

5. A method as claimed in claim 4, further comprising said second device receiving substantially concurrently said parallel FEC packets and said data packets that were functionally combined to obtain said parallel FEC packets, except for any packets lost in transmission.

6. A method as claimed in claim 1, wherein said predetermined header comprises an indication of RTP payload type.

7. A method as claimed in claim 1, wherein at least some of said plurality of data streams represent voice signals.

8. A method as claimed in claim 7, wherein at least some of said voice signals comprise telephone conversation signals.

9. A method as claimed in claim 1, wherein said parallel FEC information comprises information derived as an XOR sum taken in parallel across said at least two data streams.

10. A method as claimed in claim 1, wherein said parallel FEC information defines a parallel FEC stream, and wherein transmitting said parallel FEC information to said second device in parallel with said plurality of data streams comprises transmitting said parallel FEC stream in parallel with said plurality of data streams.

11. A method as claimed in claim 10, wherein transmitting said parallel FEC stream in parallel with said plurality of data streams comprises time division multiplexing said streams together to derive at least one output stream, and transmitting said output stream in said network.

12. A method as claimed in claim 1, further comprising carrying out the method in an IP telephony gateway.

* * * * *